United States Patent
Smith et al.

(10) Patent No.: US 9,779,221 B2
(45) Date of Patent: *Oct. 3, 2017

(54) INHERITED PRODUCT ACTIVATION FOR VIRTUAL MACHINES

(71) Applicant: Microsoft Technology Licensing, LLC, Redmond, WA (US)

(72) Inventors: Aaron J. Smith, Kenmore, WA (US); Tyron M. Balascio, Monroe, WA (US); Ajay Bhave, Bellevue, WA (US); Chih-pin Kao, Redmond, WA (US); Emeron Bachhuber, Seattle, WA (US); Mikael P. Horal, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/475,353

(22) Filed: Sep. 2, 2014

(65) Prior Publication Data

US 2014/0373014 A1    Dec. 18, 2014

Related U.S. Application Data

(63) Continuation of application No. 12/916,093, filed on Oct. 29, 2010, now Pat. No. 8,832,686.

(51) Int. Cl.
*G06F 9/455*    (2006.01)
*G06F 21/10*    (2013.01)
(Continued)

(52) U.S. Cl.
CPC ............ *G06F 21/10* (2013.01); *G06F 9/445* (2013.01); *G06F 9/45533* (2013.01);
(Continued)

(58) Field of Classification Search
None
See application file for complete search history.

(56) References Cited

U.S. PATENT DOCUMENTS

| 6,546,485 B1 | 4/2003 | Tsunedomi et al. |
| 7,353,160 B2 | 4/2008 | Voigt |

(Continued)

FOREIGN PATENT DOCUMENTS

| CN | 1360695 A1 | 7/2002 |
| CN | 101133392 A | 2/2008 |

(Continued)

OTHER PUBLICATIONS

"Application Virtualization and Software Licensing", Best Practices for Software Vendors, SafeNet, White Papers, retrieved on Aug. 10, 2010, 1-10.

(Continued)

*Primary Examiner* — Kenneth Tang
(74) *Attorney, Agent, or Firm* — Baker & Hostetler LLP

(57) ABSTRACT

Methods and systems are disclosed in which inherited activation opens a secure communication path from the host operating system (OS) to the guest (virtual machine) OS. The license state of the software on the host is passed through this channel, and software installed in the guest uses this information to inform its own product activation process. The virtualized (guest) software may then activate without any outside communication when the license requirements for the host are met.

20 Claims, 11 Drawing Sheets

(51) Int. Cl.
*G06F 9/445* (2006.01)
*G06F 21/60* (2013.01)
*G06Q 20/00* (2012.01)

(52) U.S. Cl.
CPC ........ *G06F 21/606* (2013.01); *G06F 2221/07* (2013.01); *G06Q 20/00* (2013.01)

(56) References Cited

U.S. PATENT DOCUMENTS

| | | | |
|---|---|---|---|
| 7,689,800 | B2 | 3/2010 | Oshins et al. |
| 8,832,686 | B2 * | 9/2014 | Smith ................ G06F 9/445 718/1 |
| 2006/0004667 | A1 | 1/2006 | Neil |
| 2007/0180450 | A1 | 8/2007 | Croft et al. |
| 2007/0198656 | A1 | 8/2007 | Mazzaferri et al. |
| 2008/0137848 | A1 | 6/2008 | Kocher et al. |
| 2008/0183626 | A1 | 7/2008 | Romero et al. |
| 2008/0201414 | A1 | 8/2008 | Amir Husain et al. |
| 2009/0089413 | A1 | 4/2009 | Kamei et al. |
| 2009/0138847 | A1 | 5/2009 | Beckwith et al. |
| 2009/0187897 | A1 | 7/2009 | Asao |
| 2009/0276771 | A1 | 11/2009 | Nickolov et al. |
| 2009/0328225 | A1 | 12/2009 | Chambers et al. |
| 2010/0125844 | A1 | 5/2010 | Mousseau et al. |
| 2010/0287549 | A1 | 11/2010 | Neft |
| 2010/0325628 | A1 * | 12/2010 | Haga ................ G06F 21/575 718/1 |
| 2011/0307885 | A1 * | 12/2011 | Cushion ............ G06F 21/105 718/1 |
| 2012/0035942 | A1 * | 2/2012 | Graupner .......... G06Q 10/10 705/1.1 |

FOREIGN PATENT DOCUMENTS

| | | |
|---|---|---|
| JP | 11-259285 A | 9/1999 |
| JP | 2009-080779 A | 4/2009 |
| TW | 200844863 A | 11/2008 |
| WO | WO 01/04743 A2 | 1/2001 |
| WO | WO 2009/107349 A1 | 9/2009 |

OTHER PUBLICATIONS

"Cisco Application Control Engine in the Virtual Data Center", www.cisco.com-en-US-prod-collateral-contnetw-ps5719-qa.sub.--c67-575442.h- tml, accessed Aug. 10, 2010, 3 pages.

"FlexNet Publishers: Features", www.flexerasoftware.com-products-flexnet-publisher-features.html, accessed Aug. 10, 2010, 2 pages.

"Microsoft Announces Comprehensive Virtualization Strategy to Enable Self-Managing Dynamic Systems", www.microsoft.com-presspass-press-2005-oct05-10-10VirtualizationStrategyP- R.mspx, accessed Aug. 10, 2010, 5 pages.

"VMProtect 2.05 released", www.vmprotect.ru-news.php?lang=en, accessed Aug. 10, 2010, 3 pages.

International Search Report and Written Opinion of the International Searching Authority, International Patent Application No. PCT/US2011/057601, May 10, 2012, 8 pages.

* cited by examiner

INHERITED PRODUCT ACTIVATION FOR VIRTUAL MACHINES

CROSS REFERENCE TO RELATED APPLICATIONS

This application is a continuation of U.S. patent application Ser. No. 12/916,093, filed Oct. 29, 2010, now U.S. Pat. No. 8,832,686, issued Sep. 9, 2014, the entire contents of which are incorporated herein by reference.

BACKGROUND

Virtualization enables the creation of a fully configured computer entirely out of software. For example, when a guest computer system is emulated on a host computer system, the guest computer system is said to be a "virtual machine" as the guest computer system exists in the host computer system as a software representation of the operation of one specific hardware architecture. Within a virtual machine, an operating system may be installed just like it would be on physical hardware.

Virtual machines may use software applications that apply an activation mechanism. For example, some applications may apply a licensing mechanism that allows users to use the applications on one or more virtual machines subject to certain terms and conditions. "Product activation" in this context describes the act of satisfying the licensing mechanism requirements, allowing use of the software. In a virtual machine context, unique challenges exist for applying software product activation mechanisms.

SUMMARY

Software antipiracy solutions often operate by binding the software license to the individual computer hardware by creating a hardware-based ID or thumbprint for the computer. Virtualization makes these solutions unreliable since the hardware is virtualized. The thumbprint can be edited or duplicated, and thus can be exploited to bypass product activation and copy or steal the software. Furthermore, typical server virtualization scenarios move the virtual machine from one host to another as needed. This legitimate use can break software licensing solutions that bind to a hardware thumbprint.

Methods and systems are disclosed herein in which an inherited activation mechanism opens a secure communication path from the host operating system (OS) to the guest OS. The license state of the software on the host is passed through this channel, and software installed in the guest uses this information to inform its own product activation process. The virtualized software may then activate without any outside communication when the license requirements for the host are met.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION OF ILLUSTRATIVE EMBODIMENTS

Computing Environments in General Terms

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client.

Figure 1:
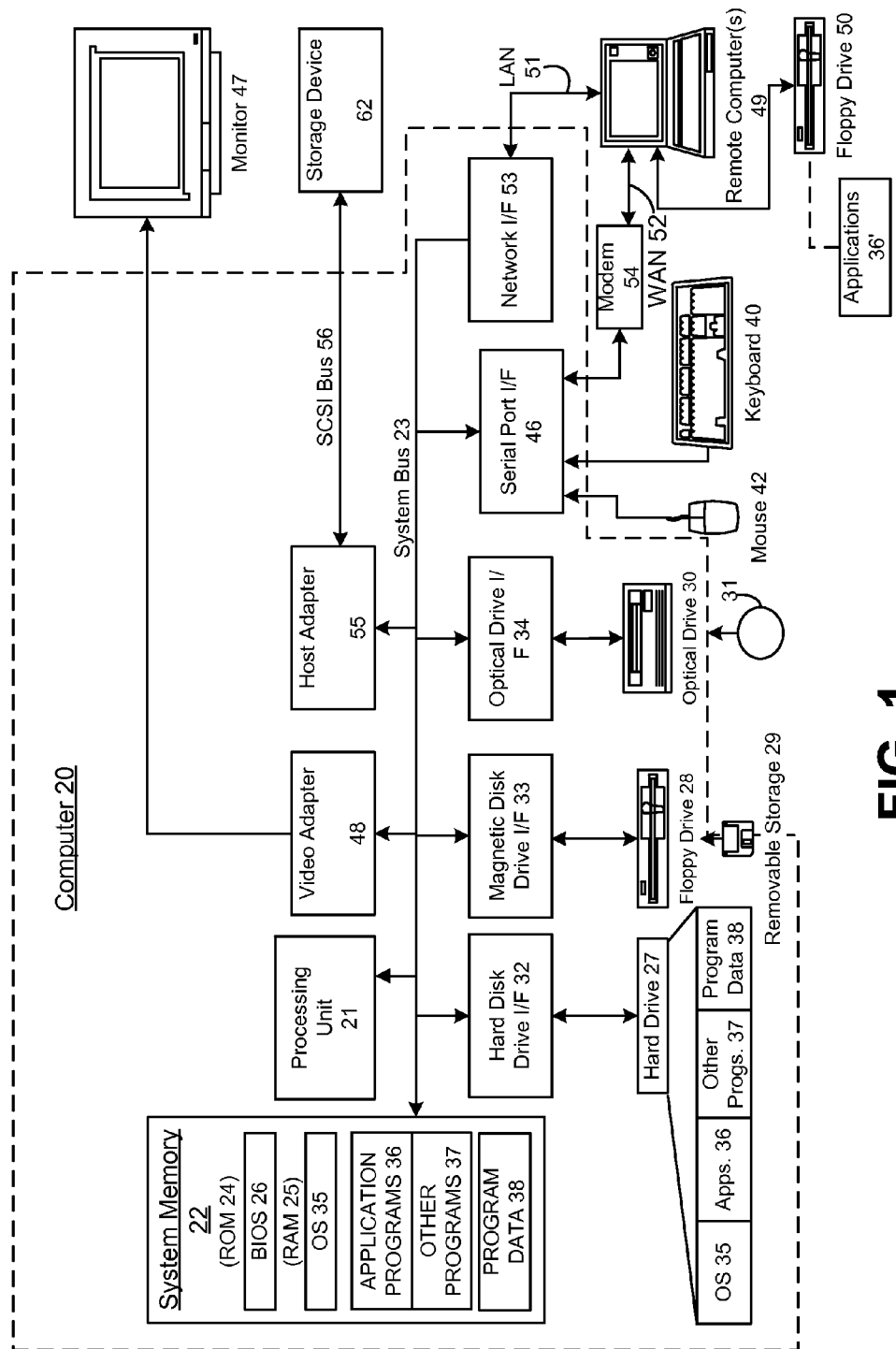
FIGS. 1 and 2 depict an example computer system wherein aspects of the present disclosure can be implemented.
Figure 2:
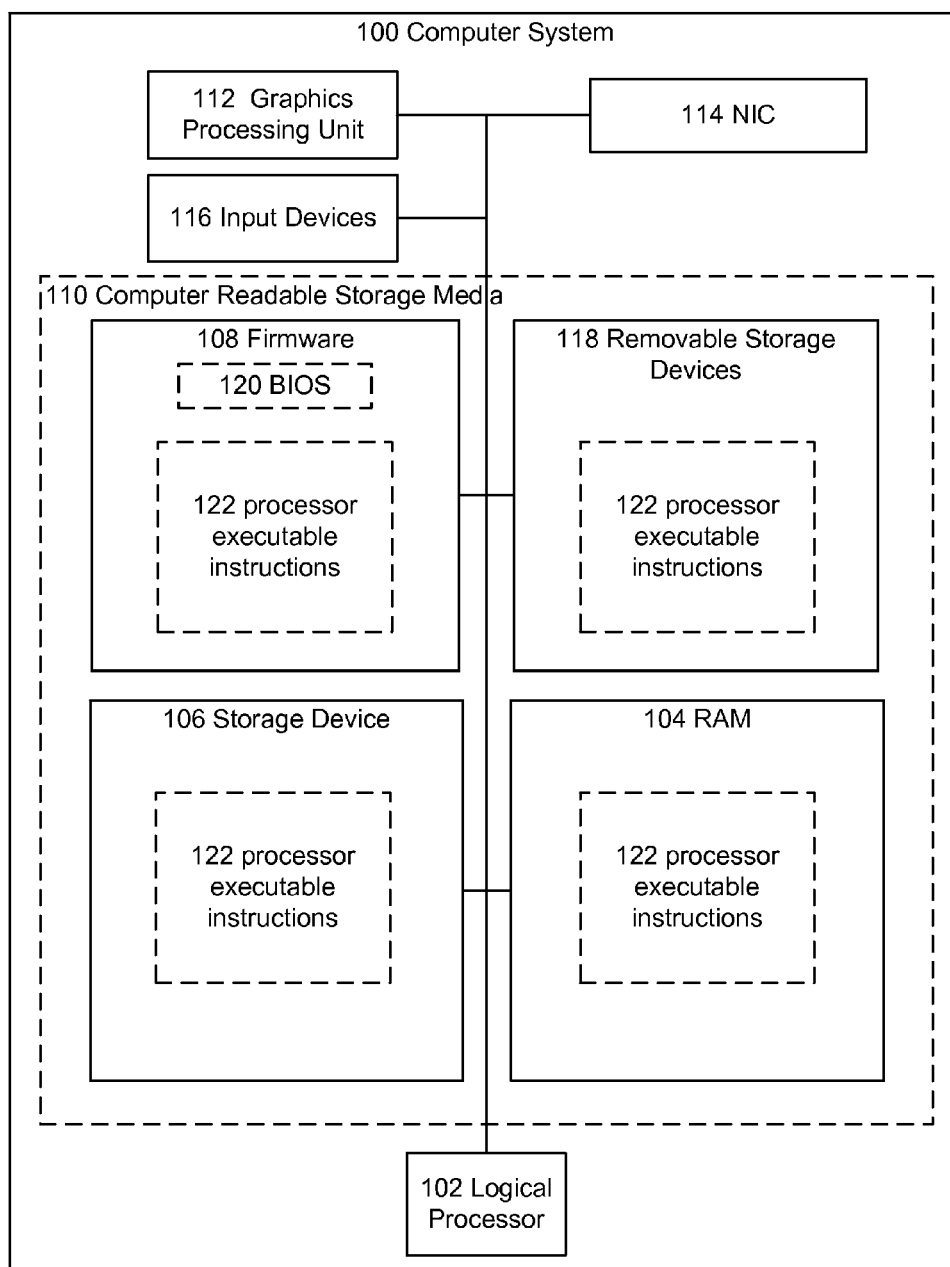

Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
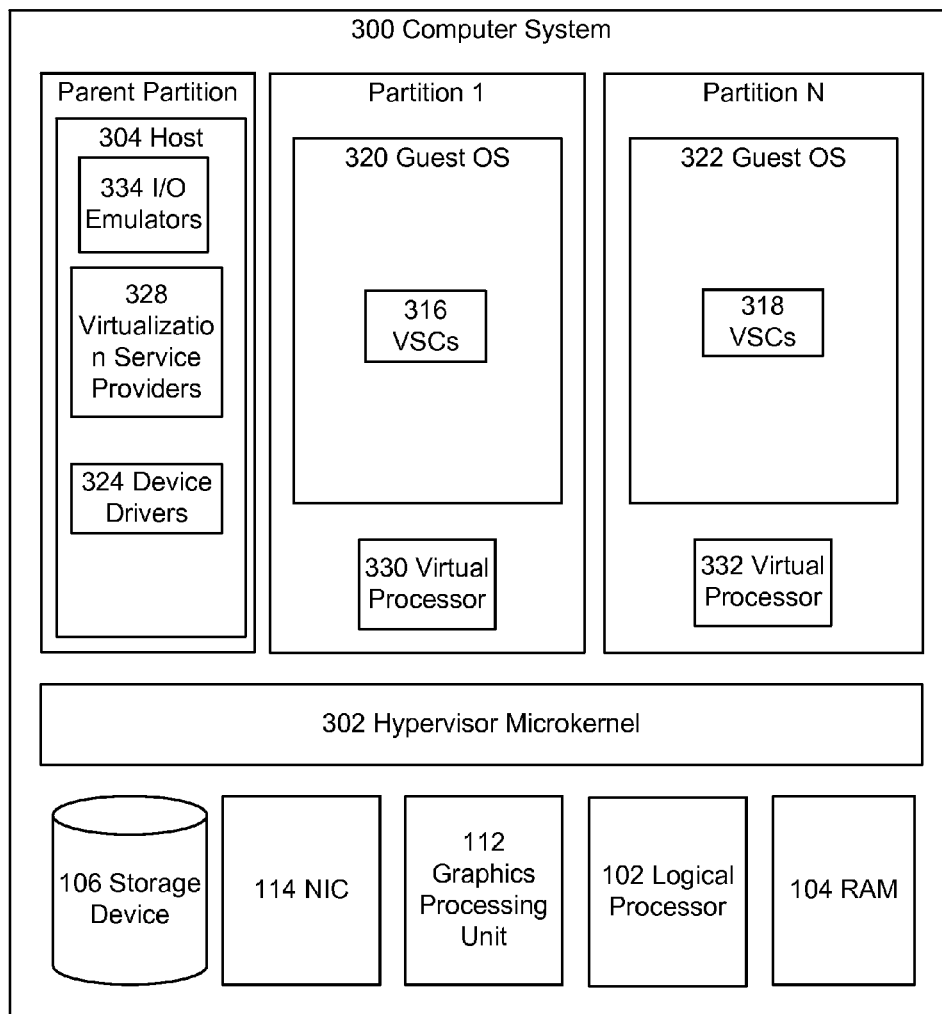
FIG. 3 depicts an operational environment for practicing aspects of the present disclosure.

Turning to FIG. 3, illustrated is an exemplary virtual machine server that can be used to generate virtual machines. In this embodiment, hypervisor microkernel 302 can be configured to control and arbitrate access to the hardware of computer system 300. Hypervisor microkernel 302 can isolate processes in one partition from accessing another partition's resources. For example, hypervisor microkernel 302 can generate execution environments called partitions such as child partition 1 through child partition N (where N is an integer greater than 1). In this embodiment, a child partition is the basic unit of isolation supported by hypervisor microkernel 302. Each child partition can be mapped to a set of hardware resources, e.g., memory, devices, logical processor cycles, etc., that is under control of the hypervisor microkernel 302. In embodiments hypervisor microkernel 302 can be a stand-alone software product, a part of an operating system, embedded within firmware of the motherboard, specialized integrated circuits, or a combination thereof.

Hypervisor microkernel 302 can enforce partitioning by restricting a guest operating system's view of the memory in a physical computer system. When hypervisor microkernel 302 instantiates a virtual machine, it can allocate pages, e.g., fixed length blocks of memory with starting and ending addresses, of system physical memory (SPM) to the virtual machine as guest physical memory (GPM). In this embodiment, the guest's restricted view of system memory is controlled by hypervisor microkernel 302. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 304. Host 304 can be an operating system (or a set of configuration utilities) and host 304 can be configured to provide resources to guest operating systems executing in the child partitions 1-N by using virtualization service providers 328 (VSPs). VPSs 328, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 328 to communicate with virtualization service clients 316 and 318 can be thought of as the virtualization path.

As shown by the figure, emulators 334, e.g., virtualized IDE devices, virtualized video adaptors, virtualized NICs, etc., can be configured to run within host 304 and are attached to resources available to guest operating systems 320 and 322. For example, when a guest OS touches a memory location mapped to where a register of a device would be or memory mapped to a device, microkernel hypervisor 302 can intercept the request and pass the values the guest attempted to write to an associated emulator. The resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (330 and 332) that guest operating systems (320 and 322) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (320 and 322) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 4:
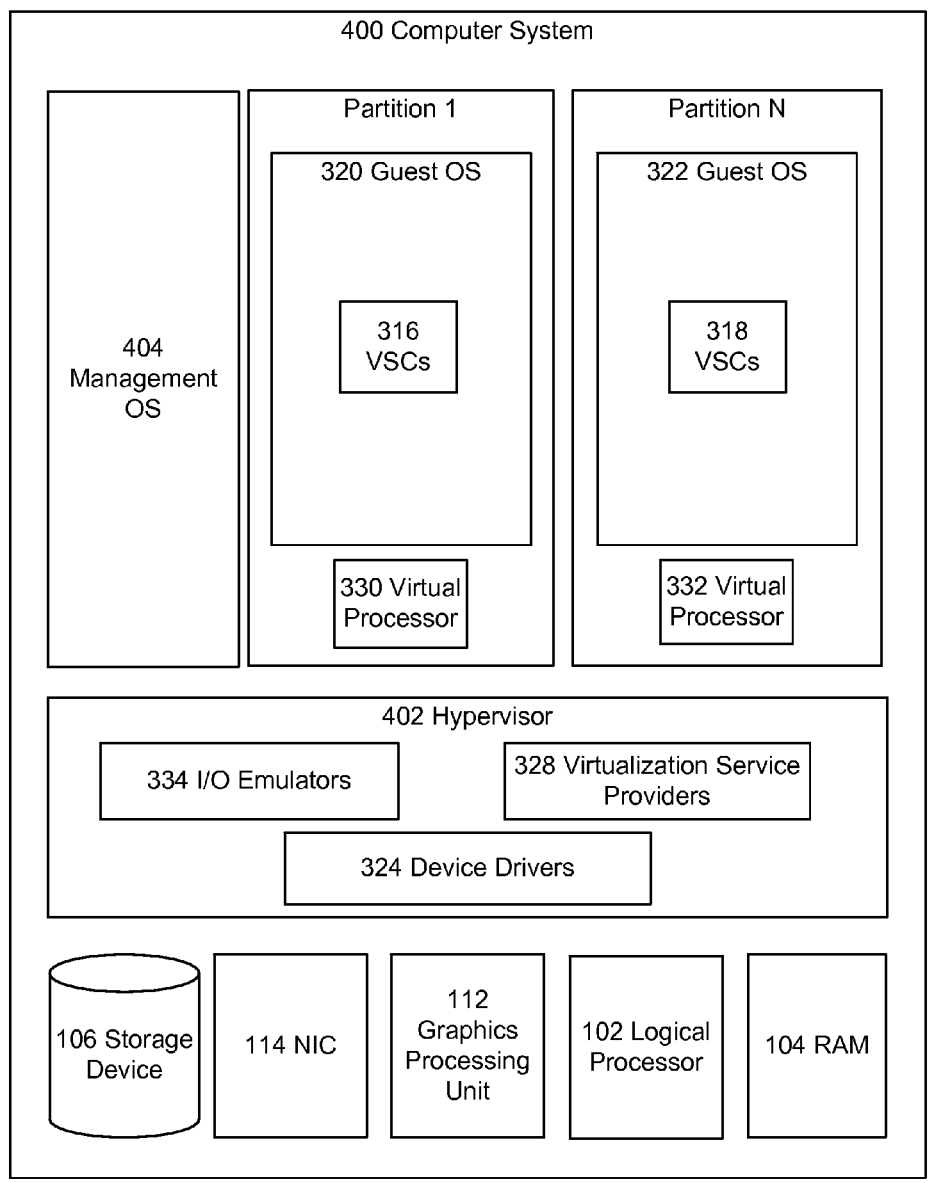
FIG. 4 depicts an operational environment for practicing aspects of the present disclosure.

Referring now to FIG. 4, illustrated is a virtual machine server based on an alternative architecture. FIG. 4 depicts similar components to those of FIG. 3; however, in this example embodiment hypervisor 402 can include a microkernel component and components similar to those in host 304 of FIG. 3 such as the virtualization service providers 328 and device drivers 324, while management operating system 404 may contain, for example, configuration utilities used to configure hypervisor 402. In this architecture, hypervisor 402 can perform the same or similar functions as hypervisor microkernel 302 of FIG. 3; however, in this architecture hypervisor 404 can be configured to provide resources to guest operating systems executing in the child partitions. Hypervisor 402 of FIG. 4 can be a stand alone software product, a part of an operating system, embedded within firmware of the motherboard or a portion of hypervisor 402 can be effectuated by specialized integrated circuits.

Figure 5:
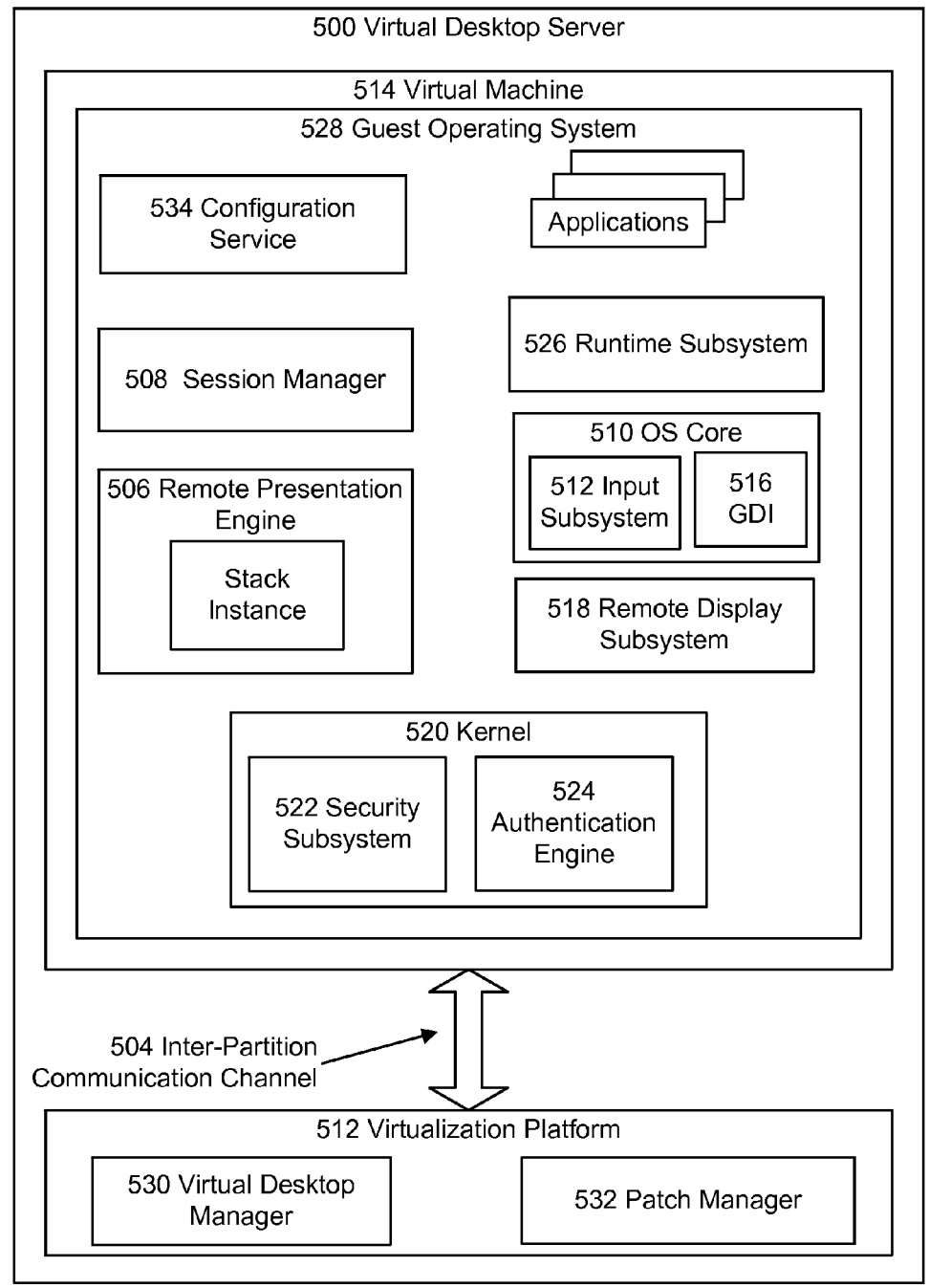
FIG. 5 illustrates a computer system including circuitry for effectuating remote desktop services.

Turning now to FIG. 5, illustrated is a high-level block diagram of virtual desktop server 500. In an embodiment, virtual desktop server 500 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and can have total control of it, e.g., the user can run as an administrator and can have full rights on the guest. In the illustrated example, virtual desktop server 500 can have components similar to computer system 300 or 400 of FIG. 3 or FIG. 4. In the illustrated example, virtualization platform 502 is a logical abstraction of virtualization infrastructure components described above in FIG. 3 and FIG. 4. The functionality described in the following sections as "within" virtualization platform 502 can be implemented in one or more of the elements depicted in FIG. 3 or FIG. 4. For example, virtual desktop manager 530 could be implemented in a host 304 of FIG. 3. More specifically, virtual desktop manager 530 could be implemented in a host operating system running in the parent partition.

Starting a virtual desktop session requires instantiation of a guest operating system within a virtual machine. In an exemplary embodiment, virtual desktop manager 530, e.g., a module of processor executable instructions, can start up virtual machine 514 (along with guest operating system 528) in response to a request. Virtual desktop manager 530 can execute on a logical processor and instruct virtualization platform 502, e.g., microkernel hypervisor 202, to allocate memory for a partition. Virtualization platform 502 can execute and set virtual devices up within virtual machine 514 and load a boot loader program into virtual machine memory. The boot loader program can execute on a virtual processor and load guest operating system 528. For example, session manager 508 can be loaded, which can instantiate environment subsystems such as runtime subsystem 526 that can include a kernel mode part such as operating system core 510. For example, the environment subsystems in an embodiment can be configured to expose a subset of services to application programs and provide an access point to kernel 520. When guest operating system 528 is loaded, the boot loader program can exit and turn control of the virtual machine over to guest operating system 528. Guest operating system 528 can execute the various modules illustrated in FIG. 5 and configure itself to host a virtual desktop session. For example, guest operating system 528 can include registry values that cause remote presentation engine 506 and/or configuration service 534 to start upon boot.

A virtual desktop session can start when guest operating system 528 receives a connection request over a network from a client. A connection request can first be handled by remote presentation engine 506. The remote presentation engine 506 can be configured to listen for connection messages and forward them to session manager 508. As illustrated by FIG. 3, when sessions are generated the remote presentation engine 506 can run a protocol stack instances for the session. Generally, the protocol stack instance can be configured to route user interface output to an associated client and route user input received from the associated client to operating system core 510. Briefly, operating system core 510 can be configured to manage screen output; collect input from keyboards, mice, and other devices.

A user credential, e.g., a username/password combination, can be received by remote presentation engine 506 and passed to session manager 508. Session manager 508 can pass the credential to a logon procedure, which can route the credential to authentication engine 524 for verification. Authentication engine 524 can generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 522. Security subsystem 522 can check the system token against an access control list associated with the object and determine whether the thread has permission based on a comparison of information in the system token and the access control list. If security subsystem 522 determines that the thread is authorized then the thread can be allowed to access the object.

Continuing with the description of FIG. 5, in an embodiment the operating system core 510 can include a graphics display interface 516 (GDI) and input subsystem 512. Input subsystem 512 in an example embodiment can be configured to receive user input from a client via the protocol stack instance for the virtual desktop session and send the input to operating system core 510. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 510 and the input subsystem 512 can be configured to determine that an icon is located at the coordinates associated with the double-click. Input subsystem 512 can then be configured to send a notification to runtime subsystem 526 that can execute a process for the application associated with the icon.

Draw commands can be received from applications and/or a desktop and processed by GDI 516. GDI 516 in general can include a process that can generate graphical object draw commands. GDI 516 in this example embodiment can be configured to pass the commands to remote display subsystem 518 that can instantiate a display driver for the session. In an example embodiment remote display subsystem 518 can be configured to include virtual display driver(s) that can be configured to receive the draw commands and send them to the client.

Also shown in FIG. 5 is a configuration service 534. In an exemplary embodiment, configuration service 534 can be used to setup guest operating system 528 to conduct virtual desktop sessions prior to connection by a client. For example, configuration service 534 can run within guest operating system 528 and be executed when guest operating system 528 boots. Since certain configuration settings require administrative privileges, configuration service 534 can be configured to run as a process with system wide privileges. Some of the exemplary actions configuration service 534 can take include, but are not limited to, actions that add an account identifier for the user to a list of administrative users for guest operating system 528, add the account identifier to a list of authorized virtual desktop users, set registry values, open guest operating system firewalls, and open the port that remote presentation engine 506 listens for connections on. Configuration service 534 is described in more detail in the following paragraphs.

In an exemplary embodiment, a communication channel can be established between virtualization platform 502 and guest operating system 528 in order to configure and control guest operating system 528. Since a remote user can have complete control of virtual machine 514, security needs to be in place to ensure that any channel used to configure and control guest operating system 528 can not also be used to attack virtualization platform 502 or other computer systems connected to an internal network. Traditionally, a networked communication channel is used to setup and control guest operating system 528. Network channels, however are difficult to deploy when guest operating system 528 is not in the same network domain as virtualization platform 502 and virtualization platform 502 is configured to deny incoming connection requests from outside the domain.

In an exemplary embodiment, inter-partition communication channel 504 can be used to communicate with configuration server 534 in order to configure and/or manage the virtual desktop session. Inter-partition communication channel 504 can be configured to be implicitly trusted by virtual machine 514 and not trusted by virtualization platform 502. In this example, information, e.g., data and/or commands can be easily routed to guest operating system 528 without any need to verify the information. On the other hand, data received from virtual machine 514 can be verified and authenticated before virtualization platform 502 takes an action. Moreover, because inter-partition communication channel 504 does not use networking, guest operating system 528 can be kept off the internal network.

Inter-partition communication channel 504 can be implicitly trusted by virtual machine 514, i.e., information received via the channel is inherently authenticated/validated, because only virtualization platform 502 can create inter-partition communication channel 504. For example, in an embodiment inter-partition communication channel 504 can be implemented at least in part as a region of memory shared between virtual machine 514 and virtualization platform 502. Virtualization platform 502 can cause a data structure indicative of a ring buffer or the like to be created in region of shared memory that can be used as a full-duplex communication channel between virtualization platform 502 and virtual machine 514. In an exemplary embodiment, the inter-partition communication channel can include features described in U.S. Pat. No. 7,689,800 entitled "Partition bus," the contents of which are herein incorporated by reference in its entirety.

Virtualization platform 502 can write information to inter-partition communication channel 504 that can be read by virtual machine 514. In an exemplary embodiment, inter-partition communication channel 504 can be message based. That is, virtualization platform 502 and virtual machine 514 can be configured to write packets of data to inter-partition communication channel 504. In the same, or another exemplary embodiment, inter-partition communication channel 504 can be event driven. In this configuration, when information is written to the channel, the receiver can be instructed to read the information from inter-partition communication channel 504 by for example, hypervisor 302 of FIG. 3.

Figure 6:
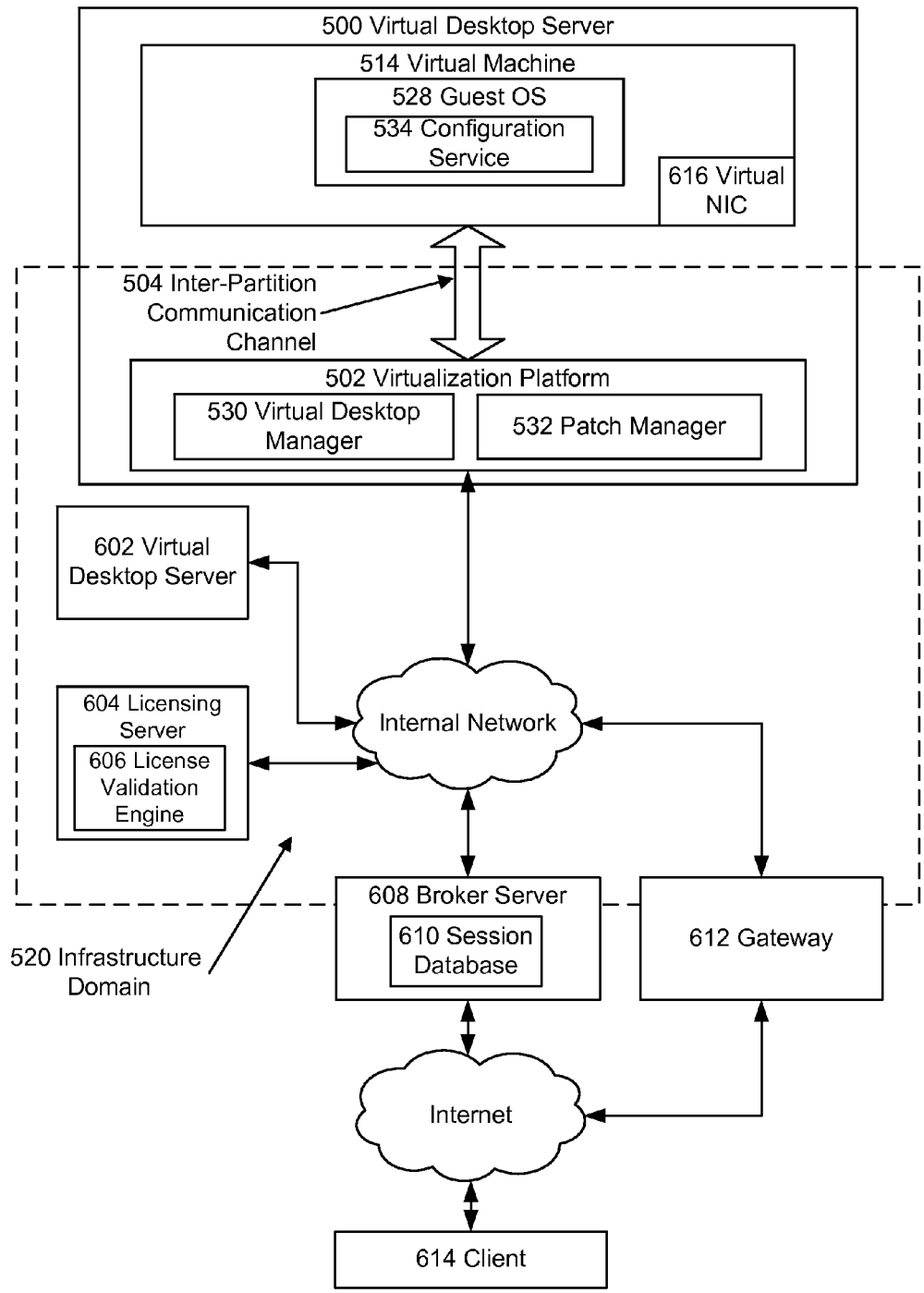
FIG. 6 depicts an operational environment for practicing aspects of the present disclosure.

Turning now to FIG. 6, illustrated is a high-level block diagram of a datacenter including virtual desktop server 500, virtual desktop server 602, licensing server 604, broker server 608, gateway 612, and client 614. The datacenter can be configured to deploy virtual desktop sessions to clients. In the illustrated example, virtualization platform 502, virtual desktop server 602, licensing server 604, broker server 608, and gateway 612 can be part of an intranet and the user credentials used to log into these computers can be members of the same domain, i.e., the infrastructure domain 520. Infrastructure domain 520 is shown in dashed lines cutting virtual desktop server 500 in half to illustrate that in an exemplary embodiment, virtual machine 514 can be part of a different domain or part of no domain.

The datacenter can include an internal network coupling a plurality of virtual desktop servers (602 and 500), which can include components similar to those illustrated by FIG. 3 or 4, to broker server 608 and licensing server 604. As one of skill in the art can appreciate, while two virtual desktop servers are shown the datacenter can have many more. Also, while virtual desktop server 500 is illustrated running one virtual machine (514), each virtual desktop server can simultaneously host many virtual machines. Or put another way, the datacenter can have M (where M is an integer greater than 1) virtual desktop servers and each of the M virtualization hosts can host N (where N is also an integer greater than 1) virtual machines.

Broker server 608 can act as an interface to the intranet for client 614. Briefly, broker server 608 can include components similar to the components described with respect to FIG. 2. Broker server 608 can have a network adapter that interfaces it to a public network, such as the Internet, and another network adapter that interfaces it to the internal network, i.e., the intranet. In this example, broker server 608 can act as a gateway for the internal network, thereby allowing virtual desktop servers and licensing server 604 to be kept off the public network.

When user of client 614 wants a virtual desktop session, he or she can click on an icon and client 614 can send one or more packets of information to broker server 608. Broker server 608 can include a module of software instructions that upon execution cause a logical processor to select a suitable virtualization host to instantiate a virtual machine to host the virtual desktop session. A user credential, e.g., a username and password combination, can be collected and broker server 608 can check session database 610 to determine whether the datacenter includes any disconnected virtual desktop sessions associated with the user credential such as a username/password combination. If session database 610 includes a disconnected virtual desktop session associated with the user credential, broker server 608 can send a signal to the virtualization host that has the disconnected session and instruct it to execute the virtual machine. If session database 610 does not have information indicative of a disconnected session for the user, broker server 608 can select a suitable virtual desktop server, e.g., one that has the resources available to instantiate a virtual machine to host a virtual desktop session.

Virtualization platform 502 can instantiate virtual machine 514 and execute guest operating system 528 on a virtual processor. Referring back to FIG. 5, guest operating system 528 can run remote presentation engine 506; return an internet protocol (IP) address of virtual NIC 616 to broker server 608; and await a connection from client 614. Broker server 608 can return the IP address of virtual NIC 616 to client 614 in a packet of information that causes a logical processor of client 614 to redirect client to the IP address virtual machine 514. Gateway 612 can receive the connection request and forward it to virtual NIC 616.

In an least one exemplary embodiment, session manager 508 can be configured to check to see if the client 614 is associated with a valid license before starting the virtual desktop session. Remote presentation engine 506 can receive a license from client 614 (or information associated with a license) and send the information to virtualization platform 502, which can send the license (or the information associated with the license) to licensing server 604. Licensing server 604 can include license validation engine 606, which can be configured to determine whether a license associated with client 614 is valid. If the license is valid, license validation engine 606 can send a signal back virtual desktop server 500 and a virtual desktop session can be started. At this point, remote presentation engine 506 can stream one or more packets of information indicative of a graphical user interface for guest operating system 528 to client 614 and receive one or more packets of information indicative of user input from client 614.

In an exemplary embodiment, when virtualization platform 502 receives a request from broker server 608 to instantiate a virtual machine, virtual desktop manager 530 can execute and send commands and/or information via inter-partition communication channel 504 to virtual machine 514 to cause guest operating system 528 to be configured to conduct a virtual desktop session. Configuration service 534 can receive the commands and/or information and configure guest operating system 528 accordingly. For example, virtual desktop manager 530 can send the identity of the user attempting to connect, desired settings for a firewall protecting guest operating system 528, registry values, a list of applications the user is allowed to operate, commands to enable virtual desktop sessions and to add the identity of the user to a list of authorized virtual desktop users, etc. Configuration service 534 can execute on a virtual processor and change appropriate settings.

Once the virtual desktop session is running, virtual desktop manager 530 can manage a running virtual desktop session via inter-partition communication channel 504. For example, virtual desktop manager 530 can issue commands to virtual machine 514 such as commands that cause the guest operating system 528 to shut down, disconnect the user, reset the guest operating system 528, etc. In the same, or another embodiment, virtual desktop manager 530 can manage the virtual desktop session receive state information for virtual machine 514, status information from remote presentation engine 506, and/or send commands to control the virtual desktop session to configuration service 534. For example, virtual desktop manager 530 can receive state information for virtual machine 514 that indicates whether virtual machine 514 is running, paused, ready, booting, as well as a list of IP addresses that can be sent to the client. In addition, virtual desktop manager 530 can receive status information for guest operating system 528 such as the identity of the user that is logged in for the virtual desktop session, and communicate some or all of this information to broker server 608.

Figure 7:
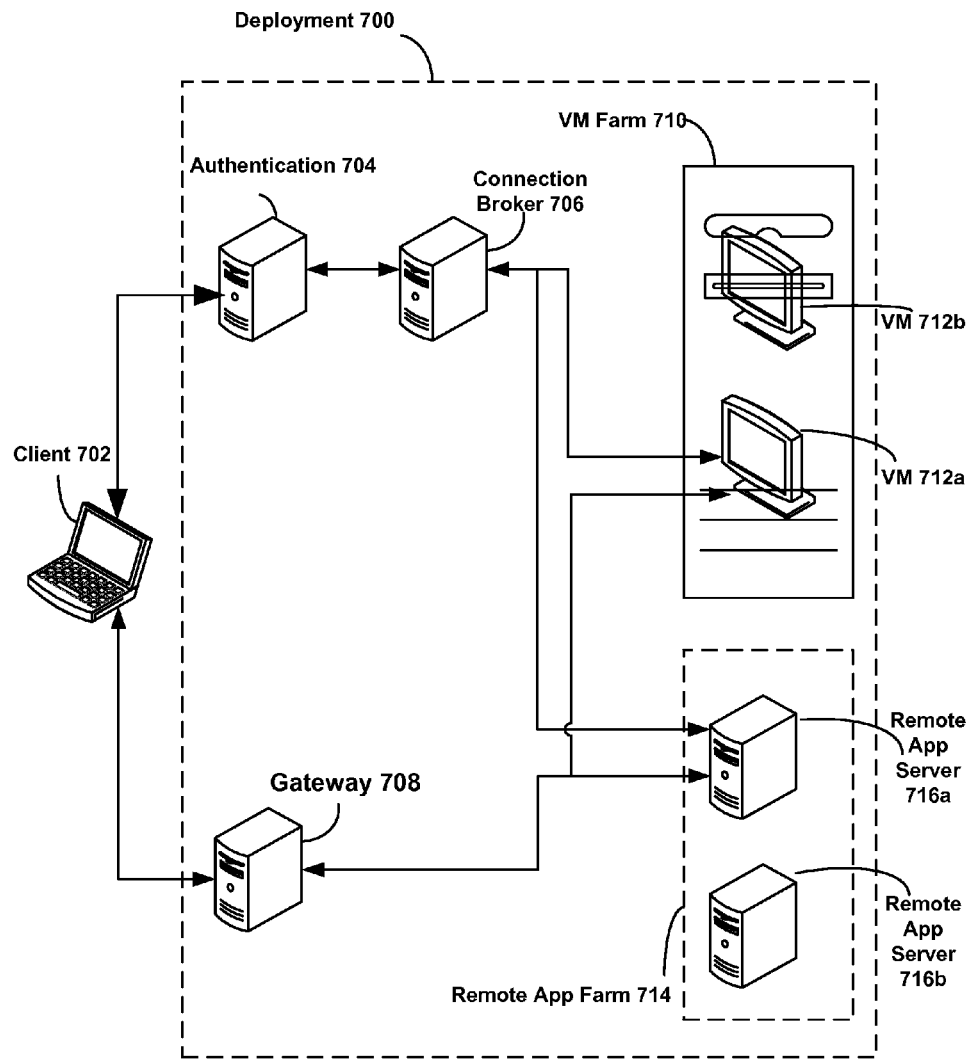
FIG. 7 depicts an operational environment for practicing aspects of the present disclosure.

FIG. 7 depicts an example system where a client has a workspace that comprises remote sessions with a plurality of servers.

The computers depicted in FIG. 7 may be similar to the computer depicted in FIG. 1. In FIG. 7, a client 702 communicates with a deployment 700, which comprises authentication server 704, connection broker 706, gateway 708, remote application server farm 714 (which in turn comprises two homogenously configured servers, remote application servers 716*a-b*), and VM server farm 710 (which in turn comprises two homogenously configured VMs, VMs 712*a-b*).

Client 702 has a workspace that comprises multiple remote resources served by one or more of remote application servers 716 and VMs 712. Client 702 may log into its workspace through an authentication server 704. Once authenticated, the client's request to connect to its workspace is transmitted from authentication server 704 to connection broker 706. Connection broker 706 is configured to broker connections between client 702 and the application servers 716 and VMs 712 that will serve remote resources with client 702, and to effectuate this, connection broker 706 is configured to communicate with application servers 716 and VMs 712 to determine what resources they are currently serving (including disconnected remote resources for a user of client 702).

Client 702 may have a workspace that comprises multiple remote resources—a remote resource comprising a remote application from remote application server 716*a*, and a remote resource that comprises a VM from VM 712*a*. As depicted, client 702 does not have a remote resource with remote application server 716*b* or VM 712*b*. These may each serve different applications or desktops, versions of an application, or other permutations. For instance, remote application server 716*a* may be serving client 702 with a remoted word processor application, and VM 712 may be serving client 702 with a remote desktop.

As can be seen through this depiction, when a user wishes to reconnect back to his or her workspace, he may desire to reconnect to the remote resources of both remote application server 716*a* and VM 712*a* through one command, rather than through one command performed three times. The user may perform this reconnect operation from client 702, or from another client computer (such as where client 702 is the user's computer at work, and the user wishes to reconnect from a computer at home during the weekend).

Figure 8:
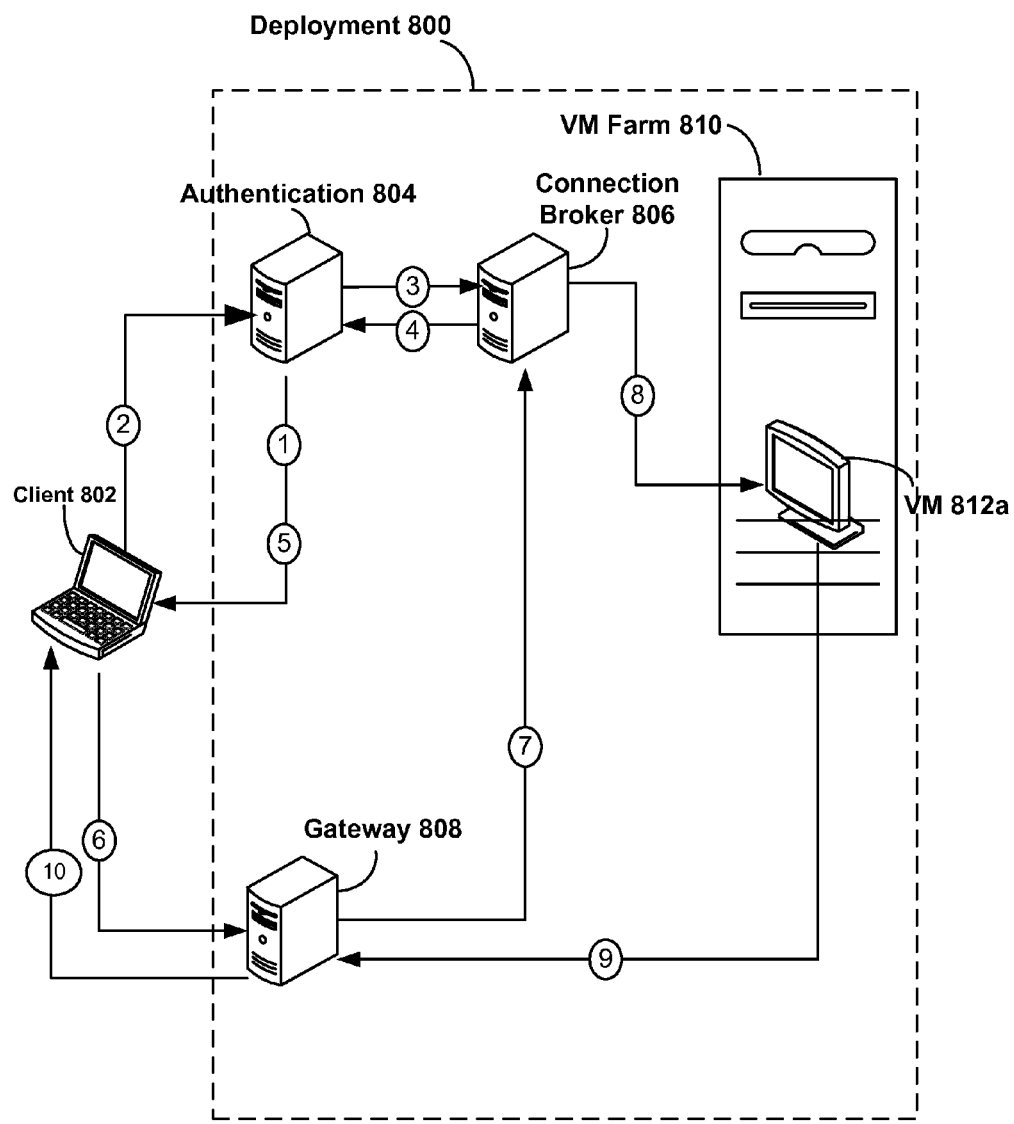
FIG. 8 depicts an operational environment for practicing aspects of the present disclosure.

FIG. 8 depicts an example an example communication flow for a client reconnecting to a remote resource of a workspace.

FIG. 8 depicts an example communication flow in a system where a client reconnects a workspace that comprises remote sessions with a plurality of servers. This communication flow may be effectuated in a system, such as the computer system depicted in FIG. 7. To wit, remote deployment 800, client 802, authentication server 804, connection broker 806, gateway 808, VM farm 810 and VM 812*a* of FIG. 8 may be similar to remote deployment 700, client 702, authentication server 704, connection broker 706, gateway 708, VM farm 710 and VM 712*a*, respectively, of FIG. 7.

A user of client 802 has previously had a workspace to remote server farm 800 that involved accessing a remote resource from VM 812*a*, and this workspace is now disconnected. Before client 802 even attempts to reconnect to the deployment 800, authentication server 804 publishes a document (via communication (1)) to client 802 identifying information about the deployment 800 that client 802 may use to access the remote resources of the deployment 800. Client 802 later reconnects by sending communication (2) to authentication server 804. Authentication server 804 validates credentials of the user and/or client (such as a login and password). Where the credentials are validated, authentication server 804 communicates with connection broker 806 to determine which remote resources (here, VM 812*a*) client 802 is to reconnect to when reconnecting its workspace. Authentication server 804 makes this determination by sending communication (3) to connection broker 806, and, in response, receiving back in communication (4) a list of server farms (here, VM farm 810) for client 802 to reconnect to. This information indicated in communication (4) is passed by authentication server 804 to client 802 in communication (5).

When client 802 has the list of servers to reconnect to from authentication server 804, client 802 reestablishes a communication with each of those server farms. As depicted in FIG. 8, that server farm is VM farm 810. Client 802 communicates (6) with gateway 808 to access the remote resources of these server farms. Gateway 808 processes communication (6), and in turn communicates (7) with connection broker 806 to convey similar information. Connection broker 806 takes the identification of the server farm from communication (7) and from it, identifies the machine (VM 812*a*) within the farm 810 that has that disconnected remote resource. Connection broker 806 sends communication (8) to VM 812*a*, instructing VM 812*a* to reconnect the remote resource to client 802. VM 812*a* reconnects with client 802 by sending a communication (9) indicative of the same to gateway 808, which, in turn sends a communication (10) indicative of the same to client 802.

It may be appreciated that this is a simplified diagram to emphasize the present invention, and that more or fewer server farms may be present and/or reconnected to, and that the communications passed may be more involved (for instance, it is shown that communications (9) and (10) establish a reconnection between VM 812*a* and client 802, where this may also involve communications that are send from client 802 through gateway 808 and to VM 812*a*).

All of these variations for implementing the above mentioned virtual machines are just exemplary implementations, and nothing herein should be interpreted as limiting the disclosure to any particular virtualization aspect.

Inherited Product Activation

Software antipiracy solutions often operate by binding the software license to the individual computer hardware by creating a hardware ID or thumbprint for the computer. Virtualization makes these solutions unreliable since the hardware is virtualized. The thumbprint can be edited or duplicated, and thus the thumbprint can be exploited to copy or steal the software. For example, a hardware profile snapshot used to activate a software application can be copied and used to illegally authorize additional copies. Furthermore, typical server virtualization scenarios move the virtual machine from one host to another as needed. This can break software licensing solutions that bind to a hardware thumbprint.

Methods and systems are disclosed herein in which an inherited activation mechanism can be used to open a secure communication path from the host operating system (OS) to the guest OS. The license state of the software on the host may be passed through this channel, and software installed in the guest may use this information to inform its own product activation process. The virtualized (guest) software may then activate without any outside communication when the license requirements for the host are met. Such a mechanism may be used to exchange activation information in a trusted manner between endpoints in a virtualized environment.

Activation may generally refer to technology that alters the functionality of software based on proof of purchase or some other event or action. In an embodiment, an inherited activation mechanism may open a secure communication path from the host OS to one or more virtual machines. Licensing information including SKU, license state and other data for software installed on the host may be passed through this channel, and the guest may use this data to inform its own product activation process. For example, when allowed by the installed licenses, the OS installed in a guest may activate without any outside communication or user interaction when it receives proof that the host OS has been activated. Furthermore, by inheriting the activation state of the host OS, the guest OS can remain activated even when moved from host to host, provided the host systems are properly activated.

Such an inherited activation mechanism may provide benefits, for example, to hosting providers and cloud computing vendors. With an inherited activation mechanism, physical host computers can use any local infrastructure or other method for product activation. Virtual guests running on these hosts may inherit the activation data, but will not need any visibility or access to the activation infrastructure used by the hosts. Sensitive data such as product keys need not be shared, and customer assets can be protected.

In one embodiment, the host OS may be configured to support an inherited activation mechanism. The host OS may gather or maintain license data for the OS itself and for any solution-aware software. This data may be secured by the host OS and made available to running guest environments via a virtualization engine. This communication may be implemented as a query from the guest and response from the host. However, the inherited activation mechanism is not limited to this communication model. The inherited activation mechanism may also support the license data being pushed (unrequested) from the host to the guest, the data being presented as a readable table or other data store for ad hoc access and other communication models. The host may also use the inherited activation communications channel to pass policy information to the virtual machine.

The inherited activation mechanism is not limited to activating software applications in virtual machines. The mechanism may be used generally to activate virtual instances of a software application regardless of whether the application is executing in the context of a guest virtual machine partition. For example, a web server may host virtualized sessions of Application X. Application X may also be installed locally and properly activated. The virtualized instances of Application X will remain activated when they are spawned by inheriting the license state of Application X on the host.

While the data being communicated can be secured to be trustworthy, the inherited activation mechanism does not require a specific validation or encryption methodology. The communication path for exchanging the activation information can use secured methodologies such as PKI or a one way hash, but any mechanism may be employed so long as the activation information is sufficiently trustworthy for the needs of the software publisher. In some embodiments, the communication path may not employ a security mechanism if the application publisher does not require one. The security of the communication path may be a design decision made based on the needs of the application and the application publisher.

As described above, the virtualization engine is the software on top of the host OS in which the virtual environment runs. In one embodiment, the virtual engine may provide a secure channel for communication between the host OS and any running guest environments. Within the guest environment, the guest OS may be configured to support the inherited activation functionality of the virtualization engine. This guest OS may be configured to allow access to the activation information, via the virtualization engine, to any software which supports inherited activation. This can include the OS itself as well as other applications.

For software on the host that supports inherited activation, including the OS and other applications, license specific data may be collected. The publisher of the software may determine which data is collected, how the data is stored and secured, and how the data is received and evaluated on the guest.

Examples of data that can be collected may include:
Software Identifiers (Model or SKU ID, Application ID, etc.)
Serial numbers
Edition labels
License state
Values from the host license such as policies, restrictions, licenses, etc.
Data from active guests may be collected such as
Installed software data (SKU data, license state, etc.)
Number of guests A stock-keeping unit (SKU) is a unique identifier for any distinct product or service that can be tracked.

In typical software activation scenarios, information may be collected and compared to rule sets embedded in XrML licenses or other trusted documents. These rule sets establish conditions that prove whether or not the software is properly licensed. Traditionally, these conditions can include but are not limited to product keys, connection to trusted hosts, possession of secret information, physical connection to crypto devices, etc. The inherited activation mechanism may add to the scope of these rules by introducing the requirement that the system is running inside a virtual machine (guest) and that specific conditions exist that satisfy the licensing requirements. When these conditions are met, the software may activate.

Events such as software start, system boot, login events, or a timer can all start the process. To prevent theft, activation may be frequently renewed. The frequency, duration, and trigger for any activation or reactivation may be determined by the software publisher.

In one embodiment, the activation information may include a shelf life for the inherited activation. For example, the information may include a time and date stamp that establishes an expiration for the activation. By using such an expiration, an unauthorized copy of the activation information will have limited utility because of the time limited activation. Virtual machines using a trusted inherited activation can continue to receive updated shelf life information through the secured channel and thus continue to use the activated software as long as it is authorized to do so.

In an embodiment, the host may use the exchanged information for asset management. For example, the host can collect SKU data from the virtual machines and use the information to track the number of users of an application or service. This information may be used to manage and limit the overall number of activations.

Figure 9:
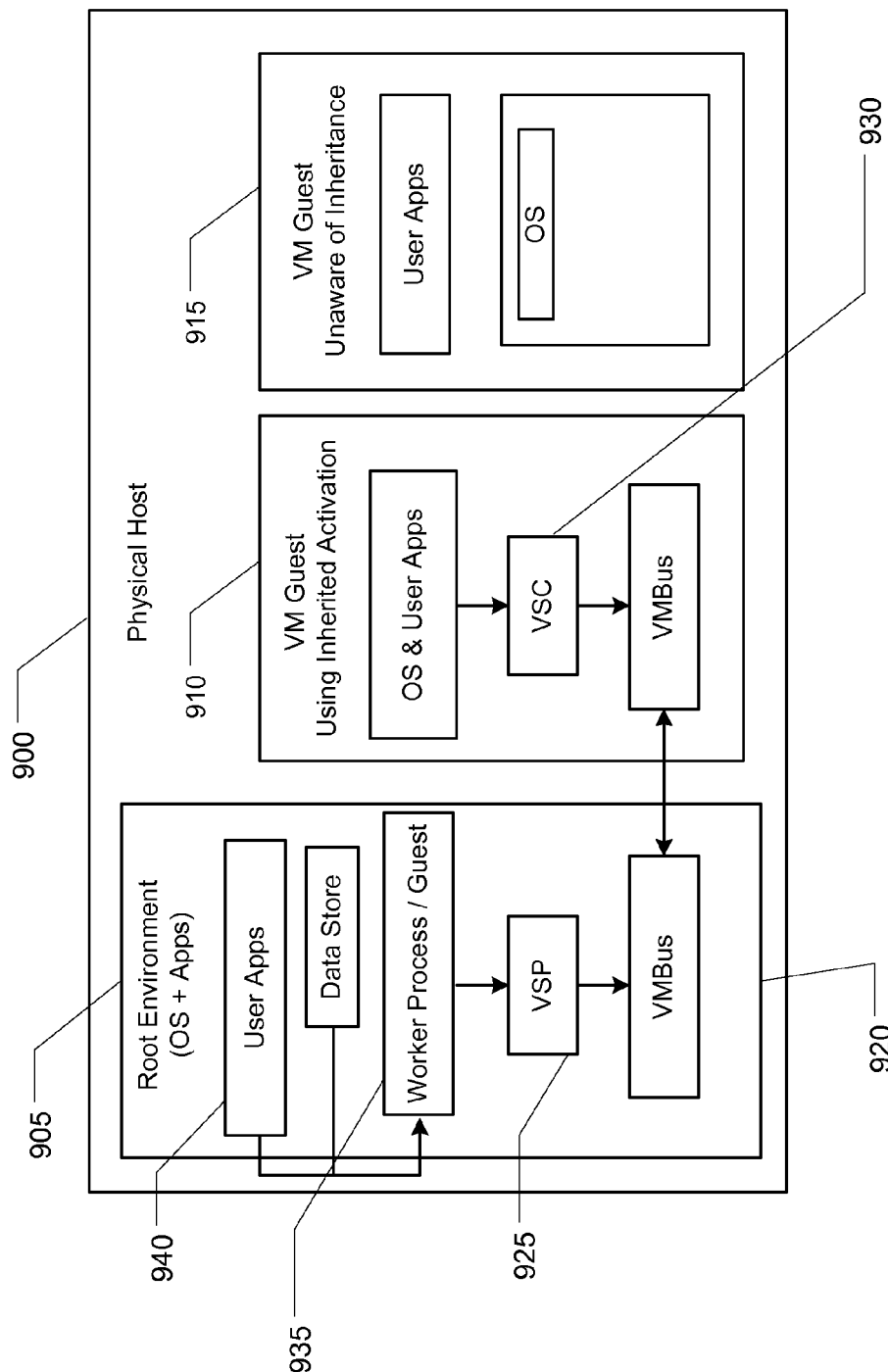
FIG. 9 illustrates an example operational procedure for practicing aspects of the present disclosure.

In one illustrative example of an inherited activation mechanism depicted in FIG. 9, a virtual machine host 900 may implement a Virtual Service Provider (VSP) 925 and a worker process 935 for each virtual machine guest instance. The VSP 925 may offer a connection to the virtual machine guest upon start up by leveraging the VMBus infrastructure 920. The VMBus infrastructure 920 may expose an API set to allow communication between the root partition and the virtual machine guest. The host VSP 925 may wait for a virtual machine guest client 910 to connect and, upon connection, use the VMbus pipe/handle 920 to write and read data to and from the virtual machine guest 910. The VSP 925 does not interpret the secure data read from the virtual machine guest 910 but instead relays this data to the licensing application 940 running on the host. Based on the information read from the virtual machine guest 910 as well as the licensing state on the host machine, a host licensing service creates a secure licensing state package which is returned to the VSP 925. The VSP 925 writes this data back to the virtual machine guest 910 through the VMBus pipe 920.

The guest virtual component of an inherited activation mechanism may be hosted inside the instance of the licensing application on the virtual machine guest. The client side component uses the VMBus infrastructure to enumerate connections from the host that matches a certain criteria which allows it to find and open a connection to the host VSP. This connection is exposed to the application in the guest virtual machine as a synthetic device. By using the APIs, data can be read and written from and to the host via the synthetic device to exchange licensing related information. The license application running on the guest virtual machine uses the licensing state package which it obtains indirectly via the host VSP to determine if the guest virtual machine is properly licensed.

In one embodiment, the inherited activation mechanism can be nested within a virtual machine architecture. For example, a host virtual machine may send inherited activation information to a guest virtual machine. The guest virtual machine may in turn spawn one or more additional virtual machines, each of which in turn may inherit the activation information, and so on. In other embodiments, the inherited activation mechanism may be configured to operate only with one host so that nesting of the activation information is not permitted.

The principles disclosed herein are not limited to the embodiments described above. The activation that is inherited need not be limited to a guest virtual machine. The inherited activation be used to activate a second virtualized instance of an activated product.

Figure 10:
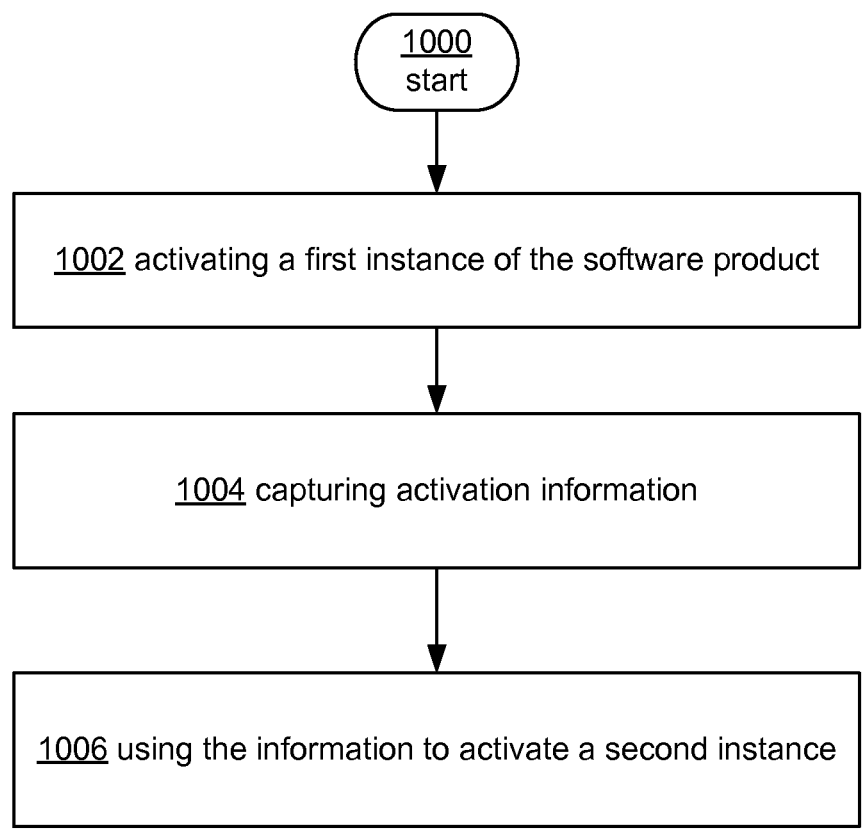
FIG. 10 illustrates an example operational procedure for practicing aspects of the present disclosure.

FIG. 10 depicts an exemplary operational procedure for activating a software product in a virtualized computing environment including operations 1000, 1002, 1004, and 1006. Referring to FIG. 10, operation 1000 begins the operational procedure and operation 1002 illustrates activating a first instance of the software product on a first parent partition in the virtualized computing environment, wherein said activating is based on information derived at least in part on a configuration of said first parent partition. Operation 1004 illustrates capturing said information. Operation 1006 illustrates using said information to activate a second instance of said software product.

Figure 11:
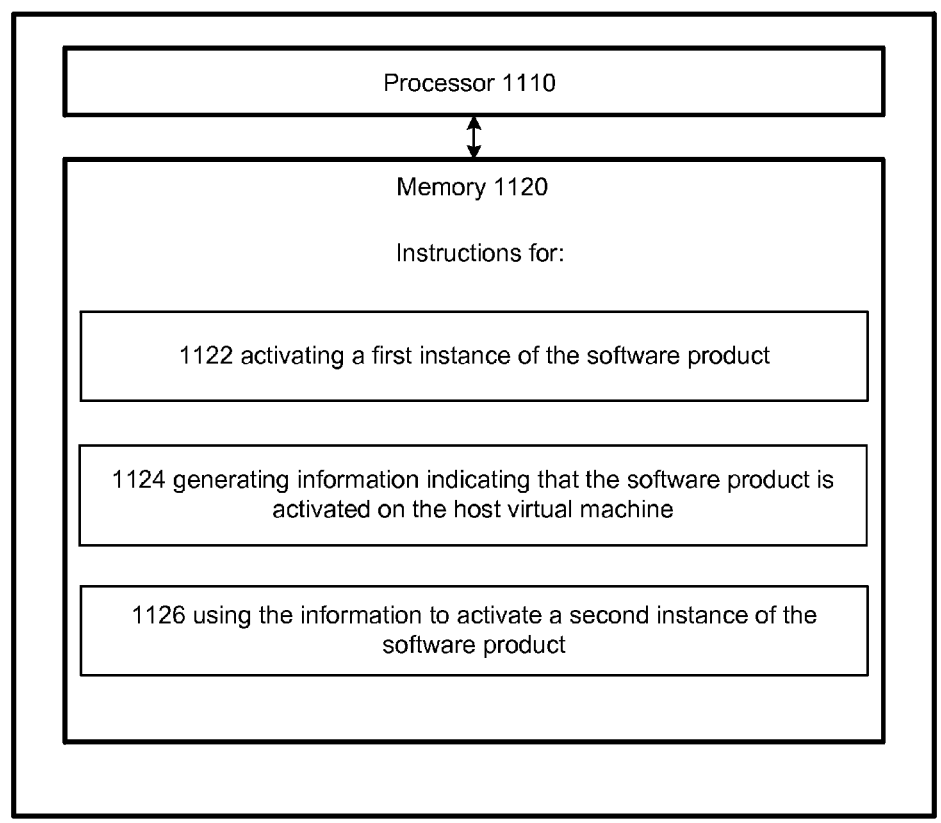
FIG. 11 illustrates an example system and operational procedure for practicing aspects of the present disclosure.

FIG. 11 depicts an exemplary system and operational procedure for activating a software product in a virtualized computing environment. Referring to FIG. 11, system 1100 comprises a processor 1110 and memory 1120. Memory 1120 further comprises computer instructions configured to activate a software product in a virtualized computing environment. Block 1122 illustrates activating a first instance of the software product on a host virtual machine. Block 1124 illustrates generating information indicating that the software product is activated on the host virtual machine. Block 1126 illustrates using said information to activate a second instance of said software product.

Any of the above mentioned aspects can be implemented in methods, systems, computer readable media, or any type of manufacture. For example, a computer readable storage medium can store thereon computer executable instructions for activating a software product in a virtualized computing environment. Such media can comprise a first subset of instructions for activating a first software product on a first parent partition in the virtualized computing environment, wherein said activating is based on information derived at least in part on a configuration of said first parent partition; a second subset of instructions for capturing said information; and a third subset of instructions for using said information to activate a second software product in a child partition of the first parent partition. It will be appreciated by those skilled in the art that additional sets of instructions can be used to capture the various other aspects disclosed herein, and that the presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for activating a software application in a virtualized computing environment, the method comprising:
    activating a first instance of the software application on a first virtual machine in the virtualized computing environment, wherein said activating comprises complying with an inherited activation mechanism for said software application;
    instantiating a secure communication channel between the first virtual machine and a second virtual machine;
    sending, to the second virtual machine via the secure communication channel, activation information in accordance with said inherited activation mechanism; and
    using said activation information to activate a second instance of said software application in the second virtual machine, the activation information usable to allow a product activation process of the second instance during an activation period in accordance with the inherited activation mechanism and continued activation when moved to another host.

2. The method of claim 1, wherein said second instance is activated on a child partition.

3. The method of claim 2, further comprising sending said activation information to said child partition, wherein the activation information is trusted by said child partition.

4. The method of claim 3, further comprising receiving, from the child partition, a request to activate the second instance, wherein said sending is in response to receiving the request.

5. The method of claim 1, wherein said second instance is a virtualized instance.

6. The method of claim 2, further comprising migrating said child partition to a second parent partition in which said software application is activated, wherein said second instance remains activated in said child partition after said migrating.

7. The method of claim 2, further comprising deactivating said second instance when said child partition is migrated to a second parent partition in which said software application is not activated.

8. The method of claim 1, wherein said second instance is activated up to a predetermined expiration time after which the second instance is deactivated.

9. The method of claim 8, wherein said predetermined expiration time is included in said activation information, further comprising using additional information to allow the second instance to remain activated beyond the predetermined expiration time.

10. The method of claim 1, further comprising using said activation information to activate multiple instances of said software application.

11. The method of claim 10, further comprising tracking a number of activated instances of said software application and limiting the number of activated instances.

12. A system for activating a software application in a virtualized computing environment, comprising:
    a processor; and
    a memory communicatively coupled to the processor, the memory bearing processor-executable instructions that, when executed on the processor, cause the processor to perform operations comprising:
    activating a first instance of the software application on a first virtual machine in the virtualized computing environment, wherein said activating comprises complying with an inherited activation mechanism for said software application;
    instantiating a secure communication channel between the first virtual machine and a second virtual machine;
    sending, to the second virtual machine via the secure communication channel, activation information in accordance with said inherited activation mechanism; and
    using said activation information to activate a second instance of said software application in the second virtual machine, the activation information usable to allow a product activation process of the second instance during an activation period in accordance with the inherited activation mechanism and continued activation when moved to another host.

13. The system of claim 12, wherein said second instance is activated on a guest virtual machine.

14. The system of claim 13, further comprising sending said activation information to said guest virtual machine, wherein the activation information is trusted by said guest virtual machine.

15. The system of claim 14, further comprising receiving, from the guest virtual machine, a request to activate the second instance, wherein said sending is in response to receiving the request.

16. The system of claim 13, further comprising processor-executable instructions that, when executed on the processor, cause the processor to perform operations comprising migrating said guest virtual machine to a second virtual machine in which said software application is activated, wherein said second instance remains activated in said guest virtual machine after said migrating.

17. The system of claim 12, wherein said second instance is activated up to a predetermined expiration time after which the second instance is deactivated.

18. A computer readable storage medium excluding transitory signals, the medium storing thereon computer executable instructions for activating a software application in a virtualized computing environment, the medium comprising instructions for:

activating a first instance of the software application on a first virtual machine in the virtualized computing environment, wherein said activating comprises complying with an inherited activation mechanism for said software application;

instantiating a secure communication channel between the first virtual machine and a second virtual machine;

sending, to the second virtual machine via the secure communication channel, activation information in accordance with said inherited activation mechanism; and using said activation information to activate a second instance of said software application in the second virtual machine, the activation information usable to allow a product activation process of the second instance during an activation period in accordance with the inherited activation mechanism and continued activation when moved to another host.

19. The computer readable storage medium of claim 18, wherein the first software application and the second software application are the same product.

20. The computer readable storage medium of claim 18, wherein said second instance is activated up to a predetermined expiration time after which the second instance is deactivated.

* * * * *